United States Patent
Tanada et al.

(10) Patent No.: US 7,502,357 B2
(45) Date of Patent: Mar. 10, 2009

(54) RADIO COMMUNICATION SYSTEM AND TRANSMITTER

(75) Inventors: Kazuo Tanada, Tokyo (JP); Hiroshi Kubo, Tokyo (JP); Akihiro Okazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 917 days.

(21) Appl. No.: 10/473,169

(22) PCT Filed: Dec. 5, 2002

(86) PCT No.: PCT/JP02/12766

§ 371 (c)(1),
(2), (4) Date: Sep. 29, 2003

(87) PCT Pub. No.: WO03/055252

PCT Pub. Date: Jul. 3, 2003

(65) Prior Publication Data

US 2004/0246916 A1 Dec. 9, 2004

(30) Foreign Application Priority Data

Dec. 21, 2001 (JP) .................... 2001-390557

(51) Int. Cl.
*H04J 3/00* (2006.01)
(52) U.S. Cl. .............. 370/345; 370/321; 455/39; 455/500; 375/295
(58) Field of Classification Search ............... 455/403, 455/101, 102, 103, 107, 24, 39, 500; 375/295, 375/299; 370/321, 345
See application file for complete search history.

(56) References Cited

U.S. PATENT DOCUMENTS

| | | | | | |
|---|---|---|---|---|---|
| 4,229,715 | A | * | 10/1980 | Henry | .......... 332/145 |
| 6,097,773 | A | * | 8/2000 | Carter et al. | ........ 375/347 |
| 6,112,086 | A | * | 8/2000 | Wala | .......... 455/434 |
| 6,442,214 | B1 | * | 8/2002 | Boleskei et al. | ....... 375/299 |
| 6,633,766 | B1 | * | 10/2003 | van der Pol | ........ 455/522 |

(Continued)

FOREIGN PATENT DOCUMENTS

EP 0 237 999 A2 3/1987

(Continued)

OTHER PUBLICATIONS

H. Takahashi et al., "Antenna and Multi-Carrier Combined Diversity System," IEICE Transactions on Communications, Institute of Electronics Information and Comm. Eng. Tokyo, JP, vol. E79B, No. 9.

(Continued)

*Primary Examiner*—CongVan Tran
(74) *Attorney, Agent, or Firm*—Birch, Stewart, Kolasch & Birch, LLP

(57) ABSTRACT

A radio communication system according to the present invention comprises a transmitter having a plurality of transmission antennas, and a receiver having a mechanism to perform a diversity reception. A plurality of multi-modulators of the transmitter allocates the same transmission data to a plurality of subcarriers, combines all transmission signals obtained by weighting each of the subcarriers, and outputs combined transmission signals. At least one of weight values for the same data is different between the multi-modulators in the weighting processing for each of the carriers.

12 Claims, 14 Drawing Sheets

U.S. PATENT DOCUMENTS 6,693,889 B1 * 2/2004 Abe et al. .................... 370/342
7,133,698 B2 * 11/2006 Miyoshi et al. .......... 455/562.1

FOREIGN PATENT DOCUMENTS

| | | |
|---|---|---|
| EP | 1 077 537 | 2/2001 |
| GB | 2 161 344 | 1/1996 |
| JP | 6-334603 A | 12/1994 |
| JP | 7-193864 A | 7/1995 |
| JP | 9-307947 A | 11/1997 |
| WO | WO-01/71928 | 9/2001 |

OTHER PUBLICATIONS

Yamamoto et al., The Institute of Electronics, Information and Communication Engineers, pp. 5-11 (1989).

* cited by examiner

FIG.1
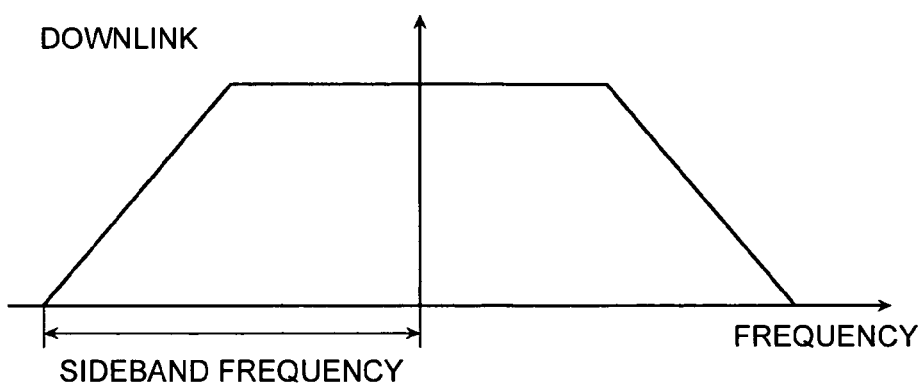
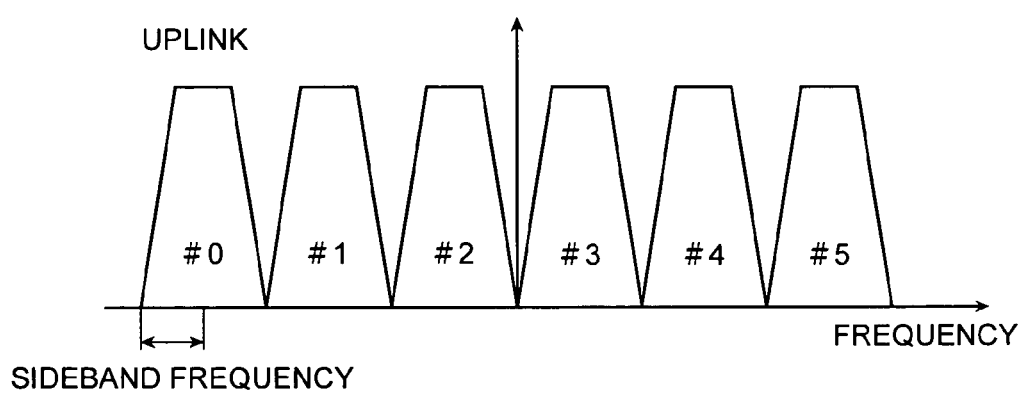

FIG.7
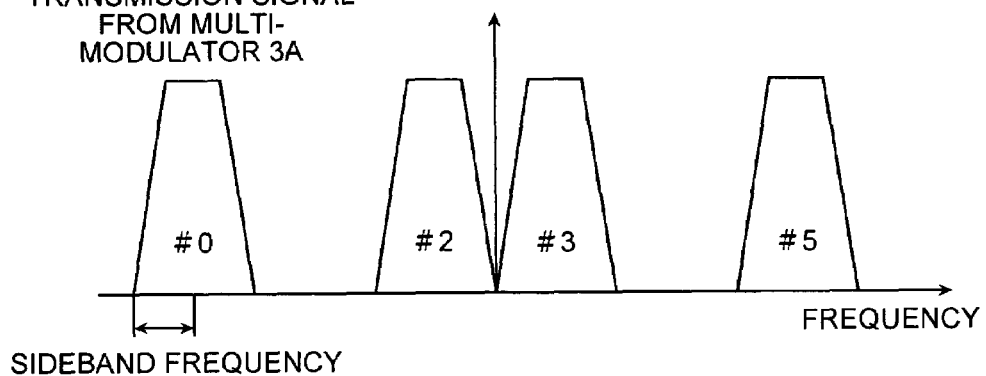
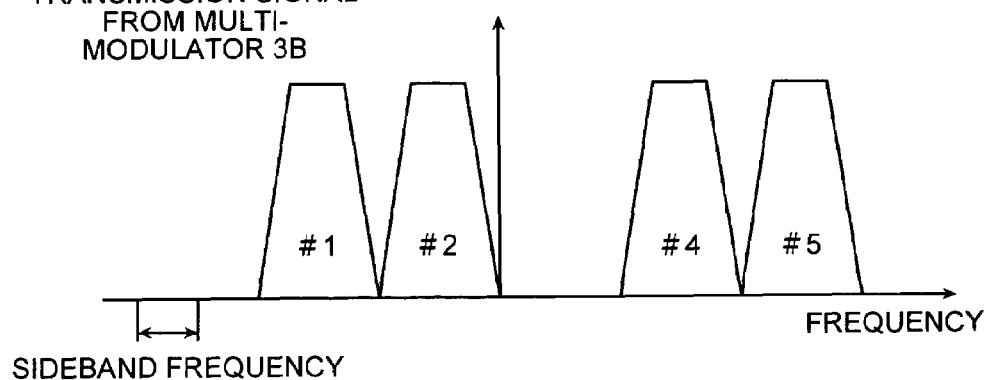
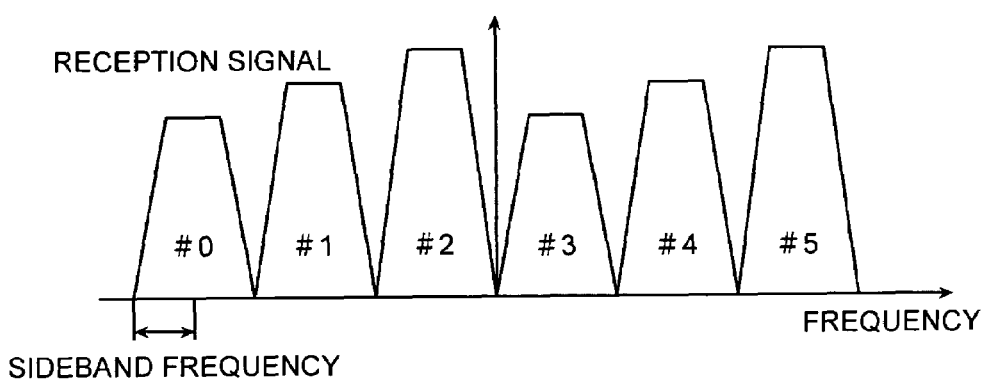

FIG.13
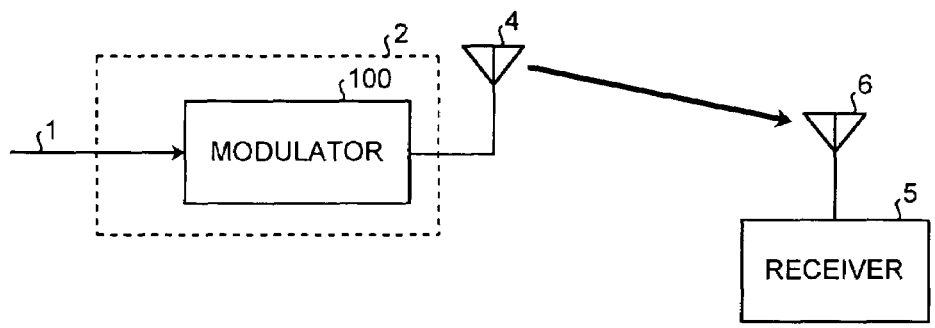
FIG.14
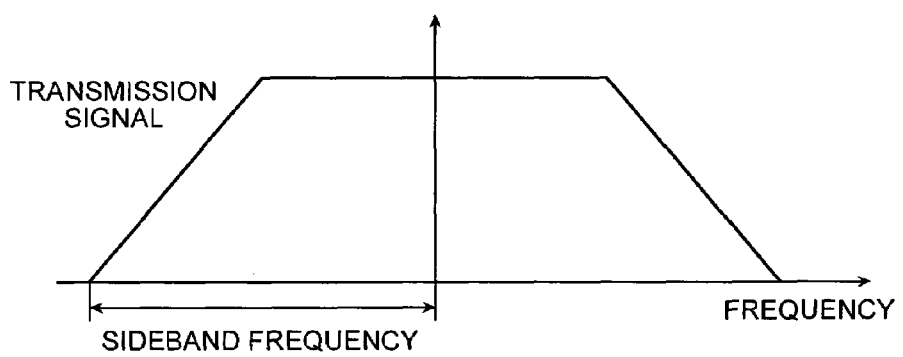
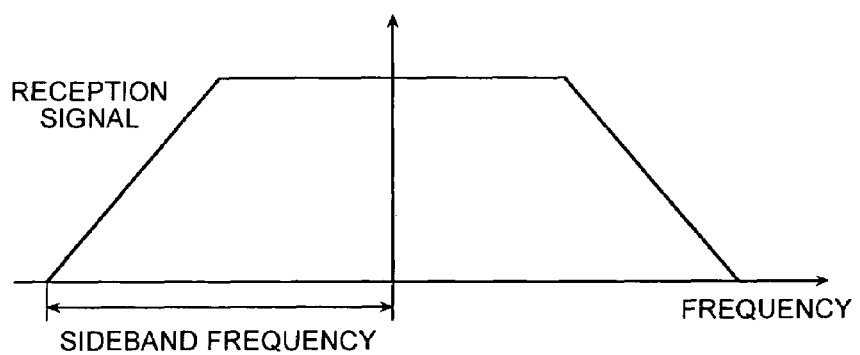

RADIO COMMUNICATION SYSTEM AND TRANSMITTER

This application is the national phase under 35 U.S.C. § 371 of PCT International Application No. PCT/JP02/12766 which has an International filing date of Dec. 5, 2002, which designated the United States of America.

TECHNICAL FIELD

The present invention relates to a radio communication system including a mobile phone, and a transmitter that constitutes the radio communication system. More particularly, the present invention relates to a radio communication system and a transmitter, which use a plurality of carriers or a plurality of SCPC (single channel per carrier) carriers for an uplink.

BACKGROUND ART

A mobile communication system generally includes a base station and a mobile terminal. Each of the base station and the mobile terminal has a transmitting function and a receiving function. In general, a radio link from a transmitter of the base station to a receiver of the mobile terminal is called a "downlink", and a radio link from a transmitter of the mobile terminal to a receiver of the base station is called an "uplink".

FIG. 10 is a schematic diagram of a conventional mobile communication system. The conventional mobile communication system includes a base station 13, an antenna for the base station 14, a mobile terminal 15, and an antenna for the mobile terminal 16. The base station 13 transmits a signal to the mobile terminal 15 for a downlink, and receives a signal from the mobile terminal 15 for an uplink, via the base station antenna 14. The mobile terminal 15 transmits a signal to the base station 13 for an uplink, and receives a signal from the base station for a downlink, via the mobile terminal antenna 16.

FIG. 11 is a timing chart of an uplink of a TDMA (time division multiple access) system. FIG. 12 illustrates frequency bands of an uplink and a downlink in the system shown in FIG. 11. The TDMA system is also called a TDM (Time Division Multiplexing)/TDMA system including the uplink and the downlink. The system operations are explained in detail in "TDMA Communications", written by Heiichi Yamamoto, et al. (Edition of IEICE (The Institute of Electronics, Information and Communication Engineers), Chapter 2, 1989).

FIG. 11 illustrates a state in which six users (i.e., channels) use the same frequency at the same time by dividing a time frame. For example, in frame #A, a communication is conducted based on a time division from #A0 to #A5. In a case of a downlink based on the TDM system, a single base station transmits signals based on the time division. Therefore, there is no influence of a relative timing error attributable to a distance. However, in a case of an uplink based on the TDMA system, since a plurality of different mobile terminals communicates with the base station simultaneously, and distances between the base station and each of mobile terminals are different, a reception timing in a reception channel (i.e., burst) at the base station becomes different. Therefore, since it is necessary to secure an assumed difference between a maximum delay time and a minimum delay time as a guard time in providing services, a time width that each mobile terminal can utilize becomes narrower than ⅙ of a frame length.

Although the problem can be relieved to a certain extent if transmission timing is controlled in each mobile terminal based on a time alignment processing, the processing is quite complicated. Furthermore, the frequency arrangement of an uplink and a downlink based on the TDM/TDMA system is a single signal spectrum as shown in FIG. 12.

FIG. 13 is a block diagram of a communication from a transmitter to a receiver, comprising a transmission signal input terminal 1, a transmitter 2, a transmitter antenna 4, a receiver 5, a receiver antenna 6, and a modulator 100. FIG. 14 illustrates a relation between a transmission signal and a reception signal in a frequency domain in the communication shown in FIG. 13.

The modulator 100 of the transmitter 2 modulates a signal that is input through the transmission signal input terminal 1. The transmitter 2 transmits the modulated signal via the transmitter antenna 4. The signal receives a phase change or an amplitude change due to a fading or the like. The receiver antenna 6 receives the signal, and the receiver 5 demodulates the received signal. When a delay time due to a reflection is ignorable as compared to a symbol period, the reception signal shows the same spectrum as that of the transmission signal, as shown in FIG. 14, although there is a slight variation in the electric field. In other words, when the same data are transmitted in the #A0 burst and the #A1 burst, and even when the receiver combines the two burst signals, it is not possible to effectively suppress a level fluctuation due to the fading.

FIG. 15 is another block diagram of communication from a transmitter to a receiver, comprising a transmitter 2A, a first transmitter antenna 4A, a second transmitter antenna 4B, a first modulator 100A, and a second modulator 100B. FIG. 16 illustrates a relation between a transmission signal and a reception signal in the frequency domain in the communication shown in FIG. 15.

The modulator 100A and the modulator 100B of the transmitter 2A modulate a signal that is input through the transmission signal input terminal 1, respectively. The transmitter 2A transmits the modulated signals through the transmitter antennas 4A and 4B, respectively. The two signals receive a phase change or an amplitude change in different forms due to the fading or the like. The receiver antenna 6 receives the signals, and the receiver 5 demodulates the received signals. In this case, the signals transmitted from the transmitter antennas 4A and 4B receive different fading influences, respectively. The receiver antenna 6 receives the signals in a combined state. As a result, an average electric field of the received signal increases. The signals after being combined have characteristics of a flat fading, in a similar manner to a case that a single antenna transmits the signal. Therefore, it is not possible to make use of a diversity effect.

Therefore, when a delay time due to a reflection is ignorable as compared to a symbol period, the reception signal shows the same spectrum as that of the transmission signal as shown in FIG. 16, in a similar manner to that shown in FIG. 14, although there is a slight variation in the electric field. In other words, when the same data are transmitted in the #A0 burst and the #A1 burst, and even when the receiver combines the two burst signals, it is not possible to effectively suppress the level fluctuation due to the fading.

According to the conventional mobile communication system, unless a complex processing like the time alignment is employed, the frame utilization efficiency is deteriorated due to the guard time. Even when an arrangement is employed that limits the number of users who can utilize the mobile communication system and transmits the same data through a plurality of channels in parallel, it is not possible to make use of the diversity effect. In other words, with the conventional mobile communication system, it is difficult to realize high capacity and high quality communications due to the above reasons.

It is an object of the present invention to provide a radio communication system and a transmitter, which can realize high capacity and high quality communications without employing a complex time alignment processing.

DISCLOSURE OF THE INVENTION

It is an object of the present invention to solve at least the problems in the conventional technology.

The radio communication system according to one aspect of the present invention includes a base station, and a plurality of mobile terminals that communicate with the base station, wherein a time division multiplexing system is applied for a downlink from the base station to the mobile terminals, and a single channel per carrier system is applied for an uplink from the mobile terminals to the base station.

The radio communication system according to another aspect of the present invention includes a structure that allocates single channel per carrier carriers with different frequencies between mobile terminals to an uplink from mobile terminals to a base station.

The radio communication system according to still another aspect of the present invention includes a transmitter having a plurality of transmission antennas and a receiver having a mechanism to perform a diversity reception, wherein the transmitter further comprises a plurality of multi-modulators that allocate same transmission data to a plurality of carriers, combine all transmission signals obtained by weighting each of the carriers, and output combined transmission signals, wherein at least one of the weight values for the same transmission data is different between the multi-modulators in the weighting processing of the carriers.

The radio communication system according to still another aspect of the present invention includes a transmitter having a plurality of transmission antennas and a receiver having a mechanism to perform a diversity reception, wherein the transmitter further comprises a plurality of multi-modulators that allocate same transmission data to a plurality of carriers, combine all transmission signals obtained by weighting each of the carriers, and output combined transmission signals, wherein at least one of the weight values for the same transmission data is different between the multi-modulators in the weighting processing of the carriers, and adds a delay to at least one of the same data.

The radio communication system according to still another aspect of the present invention includes a transmitter having a plurality of transmission antennas, wherein the transmitter further comprises an encoder that encodes transmission data at a predetermined encoding rate, and a plurality of multi-modulators that allocate predetermined encoding data of a higher encoding rate than that of an encoding series that the encoder outputs to a plurality of carriers, combine all transmission signals obtained by weighting each carrier, and output combined transmission signals, wherein at least one of the weight values for the predetermined encoding data is different between the multi-modulators in the weighting processing of the carriers.

The transmitter according to still another aspect of the present invention includes a plurality of multi-modulators that allocate the same transmission data to a plurality of carriers, combine the whole transmission signals obtained after weighting the carriers, and output the signals after the combining, wherein at least one of the weight values for the same transmission data is different between the multi-modulators in the weighting processing of the carriers.

The transmitter according to still another aspect of the present invention includes a plurality of multi-modulators that allocate same transmission data to a plurality of carriers, combine all transmission signals obtained by weighting each of the carriers, and output combined transmission signals, wherein at least one of the weight values for the same transmission data is different between the multi-modulators in the weighting processing of the carriers, and adds a delay to at least one of the same data.

The transmitter according to still another aspect of the present invention includes an encoder that encodes transmission data at a predetermined encoding rate, and a plurality of multi-modulators that allocate predetermined encoding data of a higher encoding rate than that of an encoding series that the encoder outputs to a plurality of carriers, combine all transmission signals obtained by weighting each carrier, and output combined transmission signals, wherein at least one of the weight values for the predetermined encoding data is different between the multi-modulators in the weighting processing of the carriers.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 1 illustrates frequency bands of a downlink and an uplink in a communication system according to the present invention;

FIG. 7 illustrates another example of modulation by the multi-modulator;

FIG. 13 illustrates a communication from a transmitter to a receiver;

FIG. 14 illustrates frequency bands of a transmission signal and a reception signal in the condition shown in FIG. 13;

BEST MODE FOR CARRYING OUT THE INVENTION

The present invention will be explained in detail below with reference to the accompanying drawings.

Figure 2:
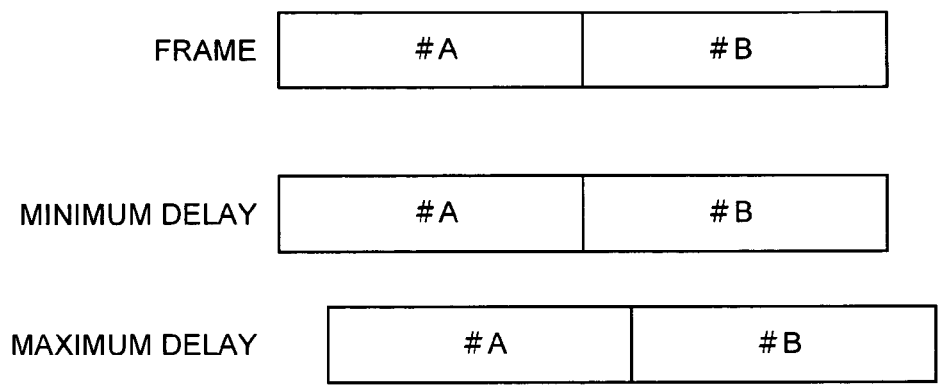
FIG. 2 illustrates a frame structure of a specific SCPC carrier of the uplink shown in FIG. 1.
Figure 15:
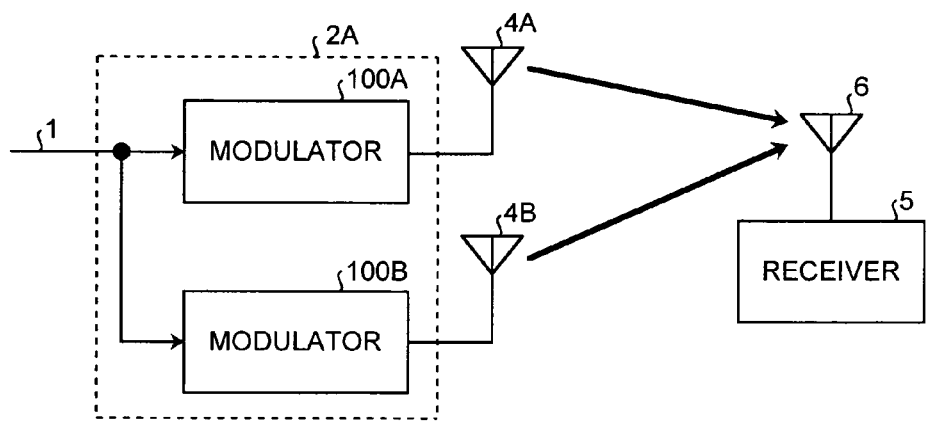
FIG. 15 illustrates a communication from another transmitter to a receiver.
Figure 16:
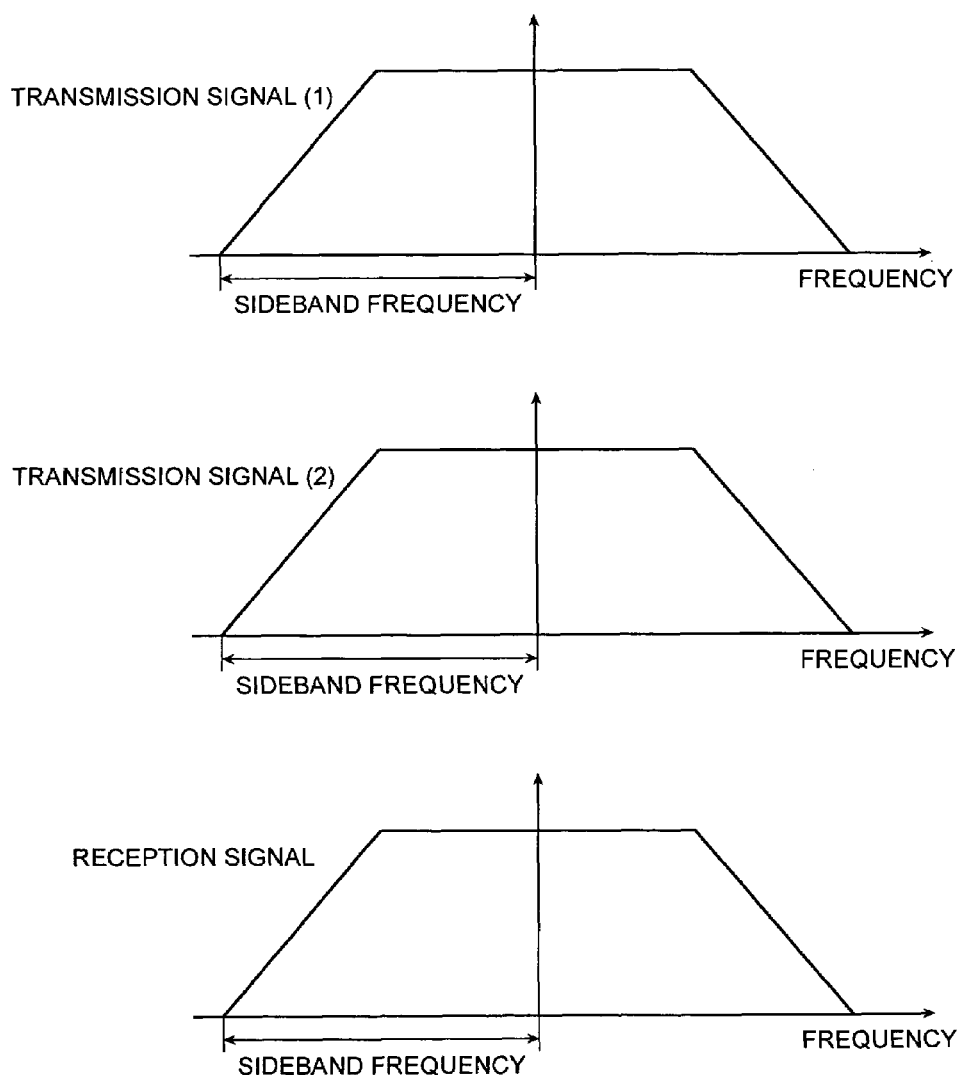
FIG. 16 illustrates frequency bands of a transmission signal and a reception signal in the condition shown in FIG. 15.

First, a radio communication system according to the first embodiment will be explained. FIG. 1 shows a relationship between a frequency region of an uplink and a frequency region of a downlink in a communication system according to the present invention. FIG. 2 shows a frame structure of a specific SCPC carrier of the uplink shown in FIG. 1. A structure of the communication system according to the present invention is similar to that of the conventional technique (FIG. 13 and FIG. 15) explained above.

In the present embodiment, a normal TDM system is used for the downlink, and an SCPC (single channel per carrier) system that allocates a single channel to each carrier is employed for the uplink. In other words, a plurality of carriers is prepared, and one radio carrier is allocated to one communication channel. While a maximum number of six users can utilize the SCPC system, it is also possible to arrange such that one user utilizes a plurality of SCPC carriers.

When the SCPC system is used for the uplink as explained above, even when delays of signals transmitted from the users are different, only reception timings of the frames in the SCPC carriers are different as shown in FIG. 2. Therefore, it is not necessary to introduce a guard time.

In other words, in the present embodiment, based on the utilization of the SCPC system for the uplink, it is not necessary to introduce a complex processing like time alignment. Therefore, it becomes possible to simply and speed up the processing. Further, in the present embodiment, signals do not arrive in burst, but arrive continuously. Therefore, it becomes easy to estimate a frequency error and bit timing. Consequently, it becomes possible to substantially improve demodulation precision.

Figure 3:
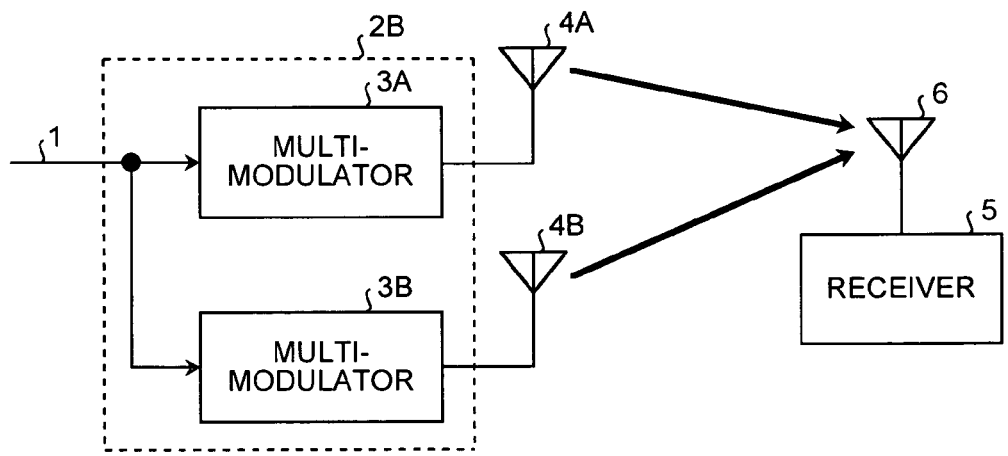
FIG. 3 is a schematic diagram of a transmitter in a radio communication system according to the present invention.

A radio communication system according to the second embodiment will be explained below. FIG. 3 shows a structure of a transmitter in the radio communication system according to the second embodiment of the present invention. In FIG. 3, 2B denotes a transmitter, and 3A and 3B denote first and second multi-modulators respectively. Constituent portions similar to those in the first embodiment are attached with identical reference numerals, and their explanation will be omitted. Functions described below with reference to FIG. 3 are limited to only the concept of functions that play important roles in the present invention. In the present embodiment, while two multi-modulators are used for the sake of convenience of the explanation, the number is not limited to this, and three or more multi-modulators may be used.

Figure 4:
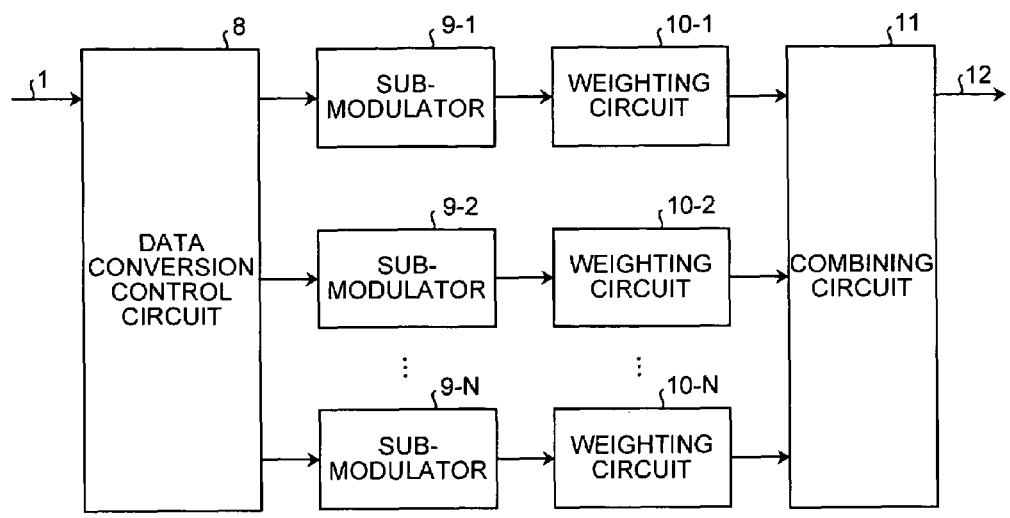
FIG. 4 is a schematic diagram of a multi-modulator.

FIG. 4 shows an example of the multi-modulator. In FIG. 4, 8 denotes a data conversion control circuit, 9-1, 9-2, . . . , and 9-N denote first, second, . . . , and N-th sub-modulators respectively, 10-1, 10-2, . . . , and 10-N denote first, second, . . . , and N-th weighting circuit respectively, 11 denotes a combining circuit, and 12 denotes a multiple modulation signal output terminal.

Figure 5:
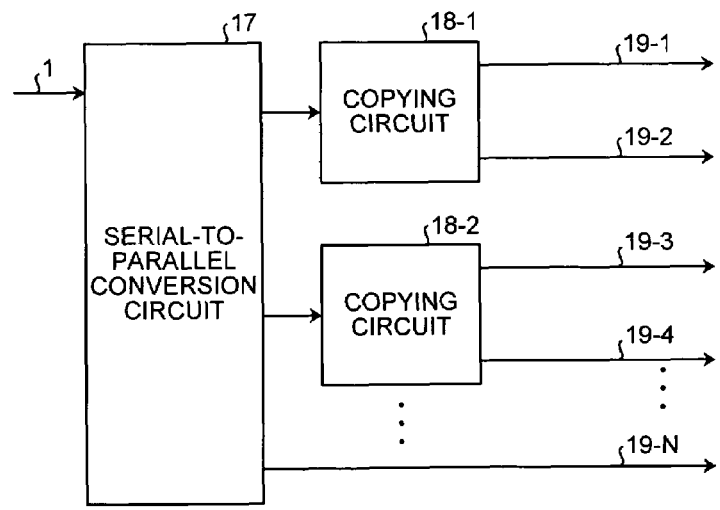
FIG. 5 is a schematic diagram of a data conversion control circuit 8 according to a second embodiment of the present invention.

FIG. 5 shows one example of the data conversion control circuit 8 according to the second embodiment. In FIG. 5, 17 denotes a serial-to-parallel conversion circuit, 18-1, 18-2, etc. denote first, second, and other copying circuits respectively, and 19-1, 19-2, 19-3, 19-4, . . . and 19-N denote first, second, third, fourth, . . . , and N-th sub-modulation signal output terminals respectively. As shown in the drawing, the sub-modulation signal output terminals (19-1 to 19-N) correspond to outputs from the serial-to-parallel conversion circuit 17 or outputs from the copying circuits. While each copying circuit has two outputs in this example, the number of outputs is not limited to this, and each copying circuit may have three or more outputs. In this case, each copying circuit outputs a plurality of the same data.

The operation of the radio communication system according to the second embodiment shown in FIG. 3 will be explained below. In the transmitter, the plurality of multi-modulators (two including 3A and 3B in this example) modulates a signal input to the transmission signal input terminal 1. The transmitter transmits the modulated signals using the plurality of transmitter antennas (two including 4A and 4B in this example).

The operation of the multi-modulators (3A, and 3B) will be explained in detail below. In each multi-modulator, first, the data conversion control circuit 8 carries out a serial-to-parallel conversion and a copying of a signal that the transmission signal input terminal 1 receives. The data conversion control circuit 8 outputs results of the processing to the sub-modulators (9-1 to 9-N). Specifically, as shown in FIG. 5, the serial-to-parallel conversion circuit 17 converts the signal that the transmission signal input terminal 1 receives, into a plurality of parallel signals. The serial-to-parallel conversion circuit 17 outputs a part of the parallel signals to some of the sub-modulation signal output terminals (i.e., some of 19-1 to 19-N). The copying circuits 18-1, 18-2, etc. copy received parallel signals, generate a plurality of the same signals (two signals in this example), and output the same signals to the rest of the sub-modulation signal output terminals. Based on this, a plurality of parallel data of the same data is generated.

The sub-modulators (9-1 to 9-N) receive the parallel data, and modulate the data in mutually different modulation frequencies. The weighting circuits (10-1 to 10-N) corresponding to the individual sub-modulators give weights (including complex numbers) to the received modulated signals. In the present embodiment, in the weighting of the carriers, at least one of weights for the same data is different between the multi-modulators. The combining circuit 11 combines the whole signals after the weighting, and outputs the combined result as a multiple modulation signal from the multiple modulation signal output terminal 12.

Examples of modulation that the multi-modulators (3A and 3B) carry out will be explained below in detail. In an example shown in FIG. 6, the multi-modulator 3A adds weights other than zero to the zero, second, and fourth SCPC carriers respectively, and adds a weight of zero to the first, third, and fifth SCPC carriers respectively. On the other hand, the multi-modulator 3B adds weights other than zero to the first, third, and fifth SCPC carriers respectively, and adds a weight of zero to the zero, second, and fourth SCPC carriers respectively. In this case, reception levels of the signals transmitted from the two transmitter antennas are different when it is assumed that the antennas are not correlated. In other words, the reception level of the zero SCPC carrier and the reception level of the first SCPC carrier vary independently.

Therefore, when the same data are transmitted to the zero SCPC carrier and the first SCPC carrier by using the outputs from the copying circuits shown in FIG. 5, the receiver diversity combines the reception signals of the zero SCPC carrier and the first SCPC carrier. As a result, it is possible to obtain a diversity gain of two branches.

In FIG. 7, as a next example of modulation that the multi-modulators (3A and 3B), the multi-modulator 3A adds weights other than zero to the zero, second, third, and fifth SCPC carriers respectively, and adds a weight of zero to the first and fourth SCPC carriers respectively. On the other hand, the multi-modulator 3B adds weights other than zero to the first, second, fourth, and fifth SCPC carriers respectively, and adds a weight of zero to the zero and third SCPC carriers respectively. In this case, reception levels of the signals transmitted from the two transmitter antennas are different when it is assumed that the antennas are not correlated. In other words, the reception levels of the zero SCPC carrier, the first SCPC carrier, and the second SCPC carrier respectively vary independently.

Therefore, when the same data are transmitted to the zero SCPC carrier, the first SCPC carrier, and the second SCPC carrier, the receiver diversity combines the reception signals of the zero SCPC carrier, the first SCPC carrier, and the second SCPC carrier. As a result, it is possible to obtain a diversity gain of three branches.

Figure 8:
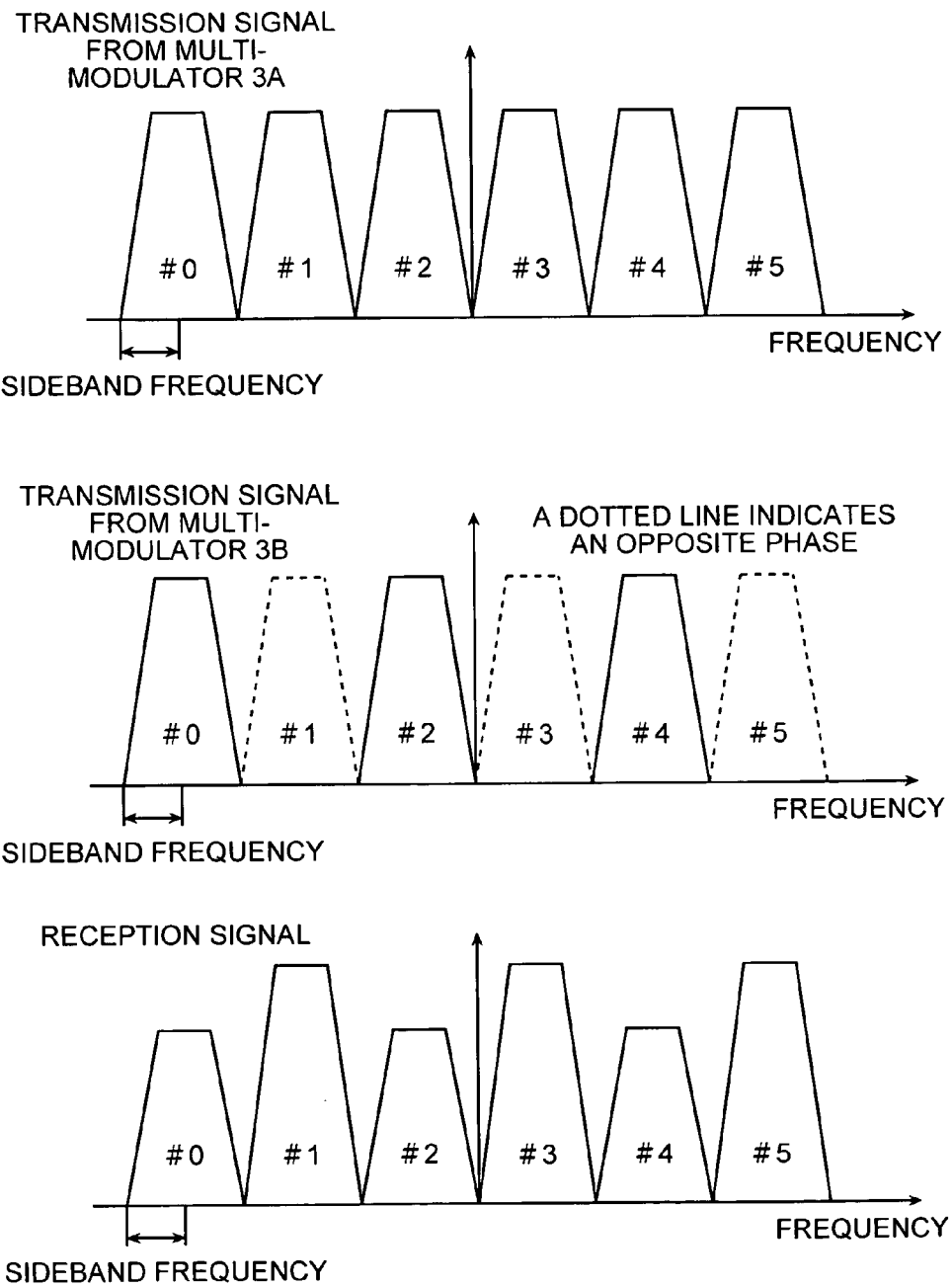
FIG. 8 illustrates still another example of modulation by the multi-modulator.

A next example of modulation that the multi-modulators (3A and 3B) carry out will be explained. In FIG. 8, the multi-modulator 3A adds weights other than zero to all the SCPC carriers. On the other hand, the multi-modulator 3B adds weights to the zero, second, and fourth SCPC carriers respectively, and adds inverted weights to the first, third, and fifth SCPC carriers respectively. In this case, reception levels of the signals transmitted from the two transmitter antennas are different when it is assumed that the antennas are not correlated. In other words, the reception level of the zero SCPC carrier and the reception level of the first SCPC carrier vary independently.

Therefore, when the same data are transmitted to the zero SCPC carrier and the first SCPC carrier by using the outputs from the copying circuits shown in FIG. 5, the receiver diversity combines the reception signals of the zero SCPC carrier and the first SCPC carrier. As a result, it is possible to obtain a diversity gain of two branches.

As explained above, according to the present embodiment, at least one of the weights for the same data is different between the multi-modulators in the weighting of the carriers. Based on this, it is possible to obtain a larger diversity gain. Consequently, it is possible to realize communications in high quality.

Figure 9:
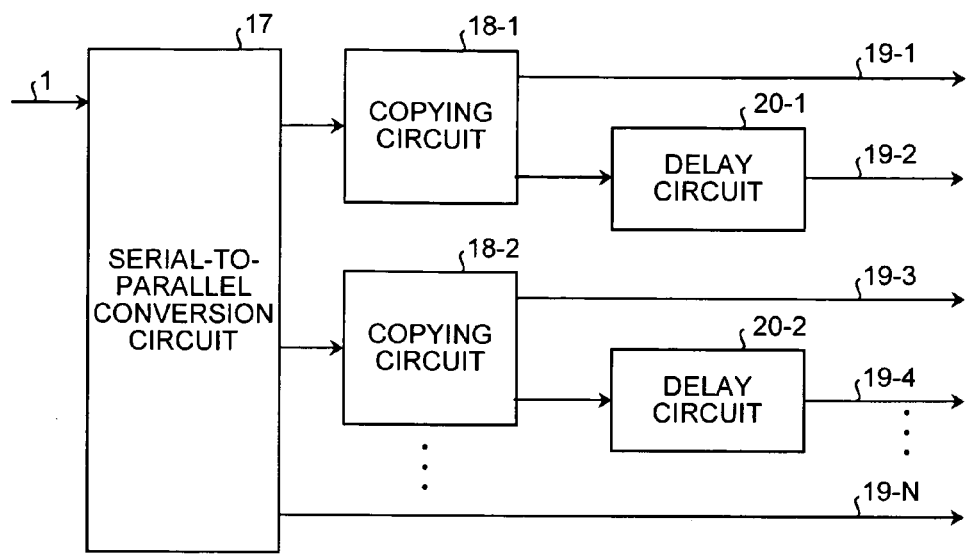
FIG. 9 is a schematic diagram of a data conversion control circuit 8 according to a third embodiment of the present invention.
Figure 10:
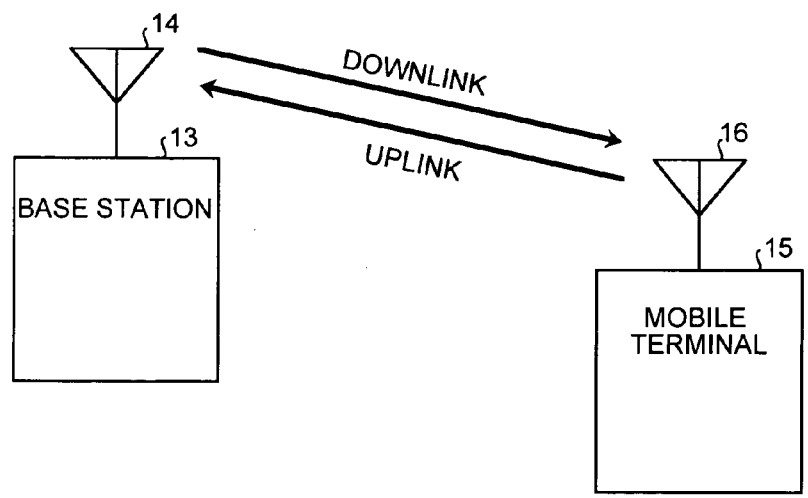
FIG. 10 is a schematic diagram of a conventional mobile communication system.
Figure 11:
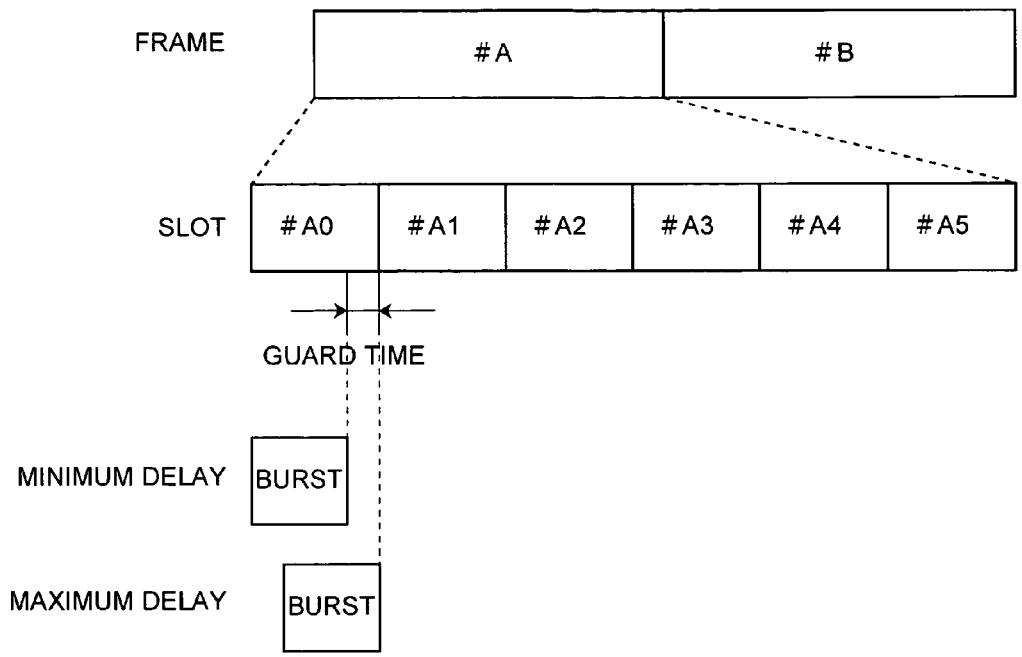
FIG. 11 is a timing chart of an uplink in a TDMA system.
Figure 12:
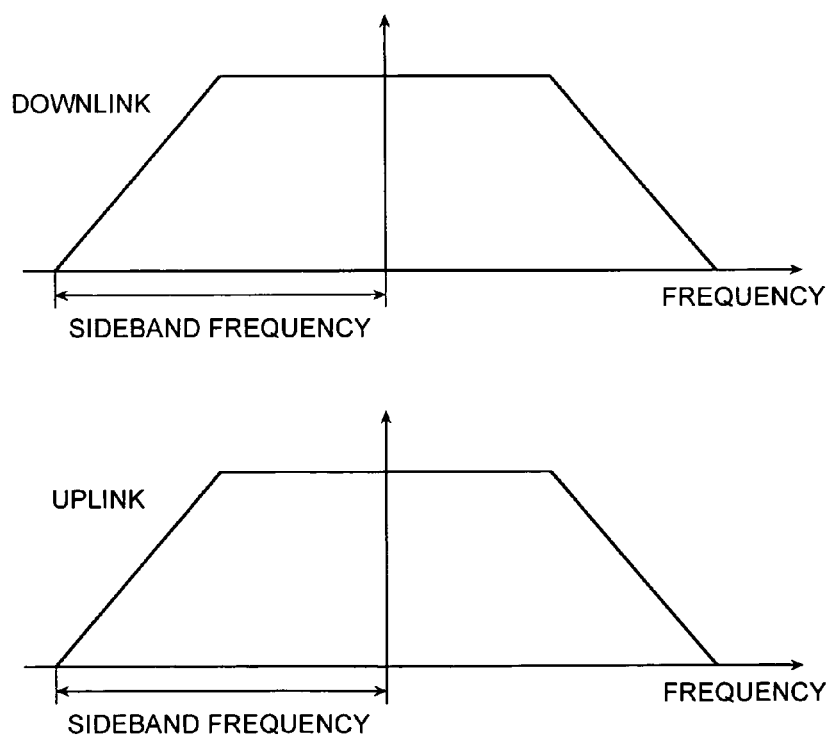
FIG. 12 illustrates frequency bands of a downlink and an uplink in the TDMA system.

A radio communication system according to the third embodiment will be explained below. FIG. 9 shows one example of the data conversion control circuit 8 according to the third embodiment. Delay circuits 20-1, 20-2, etc. shown in FIG. 9 denote first, second and other delay circuits respectively. In the present embodiment, as shown in the drawing, the sub-modulation signal output terminals (19-1 to 19-N) correspond to outputs from the serial-to-parallel conversion circuit 17, outputs from the copying circuits, or outputs from the delay circuits. While each copying circuit has two outputs in this example, the number of outputs is not limited to this, and each copying circuit may have three or more outputs. While a delay circuit is disposed at one of the outputs of each copying circuit, the position is not limited to this, and whether the delay circuit is to be disposed at each output of the copying circuit can be suitably changed. In this case, each copying circuit outputs a plurality of the same data, and the output timing is different depending on presence or absence of a delay circuit.

The structures of the radio communication system (refer to FIG. 3) and the multi-modulators (refer to FIG. 4) according to the present embodiment are similar to those in the second embodiment. Therefore, corresponding portions are attached with identical reference numerals, and their explanation will be omitted. The data conversion control circuit 8 having a structure different from that of the second embodiment will be explained in detail below.

First, the serial-to-parallel conversion circuit 17 converts the signal that the transmission signal input terminal 1 receives, into a plurality of parallel signals. The serial-to-parallel conversion circuit 17 outputs a part of the parallel signals to some of the sub-modulation signal output terminals (i.e., some of 19-4 afterward). The copying circuits 18-1, 18-2, etc. copy received parallel signals, generate a plurality of the same signals (two signals in this example), and output one of the copy signals to the corresponding sub-modulation signal output terminal (19-1, 19-3, etc.). The copying circuits 18-1, 18-2, etc. transmit the other copy signal to the delay circuits (20-1, 20-2, etc.) respectively. The delay circuits add a predetermined delay to the received copy signals, and output the delay-added copy signals to the sub-modulation signal output terminals (19-2, 19-4, etc.). In the present embodiment, a delay is added to at least one of the same data. Based on this, the same data of different timings are generated.

The sub-modulators (9-1 to 9-N) receive the parallel data, and modulate the data in mutually different modulation frequencies. The weighting circuits (10-1 to 10-N) corresponding to the individual sub-modulators give weights (including complex numbers) to the received modulated signals. In the present embodiment, in the weighting of the carriers, at least one of weights for the same data is different between the plurality of multi-modulators. The combining circuit 11 combines the whole signals after the weighting, and outputs the combined result as a multiple modulation signal from the multiple modulation signal output terminal 12.

Examples of modulation that the multi-modulators (3A and 3B) carry out will be explained below in detail. A weighting processing is carried out in a similar manner to that according to the second embodiment shown in FIG. 6. Then, reception levels of the zero SCPC carrier and the second SCPC carrier, and reception levels of the first SCPC carrier and the third SCPC carrier vary independently. In the present embodiment, the same data are transmitted to the zero SCPC carrier and the first SCPC carrier. The same signals having the same delay are transmitted to the second SCPC carrier and the third SCPC carrier. In this case, the copying circuit has four outputs, and delay circuits are disposed at two outputs out of the four.

When a fading time variation is fast, a sufficient time difference is given by inserting a delay. Consequently, the fading becomes independent. The receiver diversity combines the reception signals of the zero SCPC carrier and the first SCPC carrier, and the reception signals of the second SCPC carrier and the third SCPC carrier for which delay time is compensated. As a result, it is possible to obtain a diversity gain of four branches.

A next example of modulation that the multi-modulators (3A and 3B) carry out will be explained. A weighting processing is carried out in a similar manner to that according to the second embodiment shown in FIG. 7. Then, reception levels of the zero SCPC carrier, the first SCPC carrier, and the second SCPC carrier vary independently. In the present embodiment, the same data are transmitted to the zero SCPC carrier, the first SCPC carrier, and the second SCPC carrier. The same signals having the same delay are transmitted to the third SCPC carrier, the fourth, and the fifth SCPC carrier. In this case, the copying circuit has three outputs, and delay circuits are disposed at the three outputs.

Therefore, when the receiver diversity combines the reception signals of the zero SCPC carrier, the first SCPC carrier, and the second SCPC carrier, and the reception signals of the third SCPC carrier, the fourth SCPC carrier, and the fifth SCPC carrier for which a delay time is compensated, it is possible to obtain a diversity gain of six branches.

As explained above, according to the present embodiment, at least one of the weights for the same data is different between the plurality of multi-modulators in the weighting of the carriers. Further, a delay is added to at least one of the same data. Based on this, it is possible to obtain a much larger diversity gain. Consequently, it is possible to realize communications in higher quality.

Figure 17:
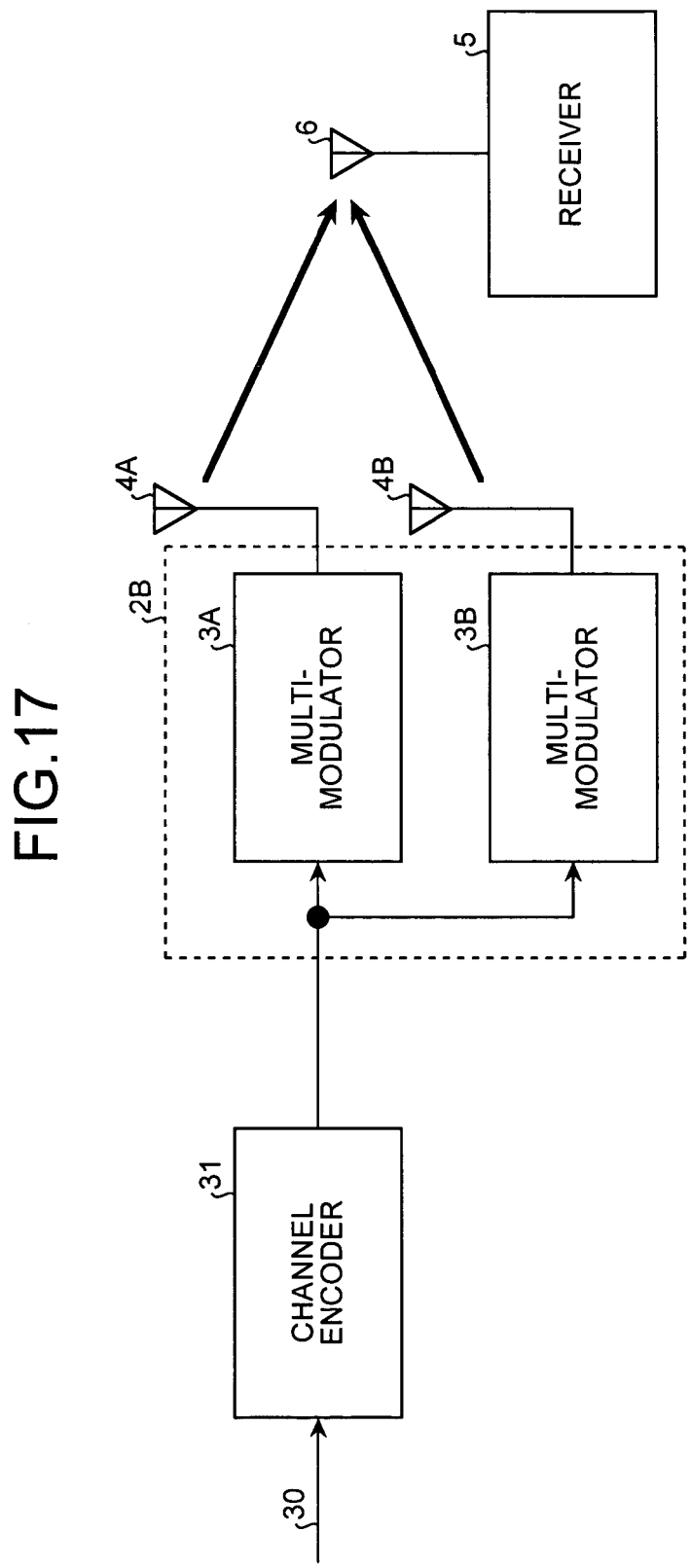
FIG. 17 is a schematic diagram of a radio communication system according to a fourth embodiment of the present invention.

A radio communication system according to the fourth embodiment will be explained below. FIG. 17 shows a structure of the radio communication system according to the fourth embodiment of the present invention. In FIG. 17, 30 denotes transmission data, and 31 denotes a channel encoder. Constituent portions similar to those in the first to third embodiments are attached with identical reference numerals, and their explanation will be omitted. Internal structures of the multi-modulators 3A and 3B are similar to those of the multi-modulators explained in the second embodiment with reference to FIG. 4.

Figure 18:
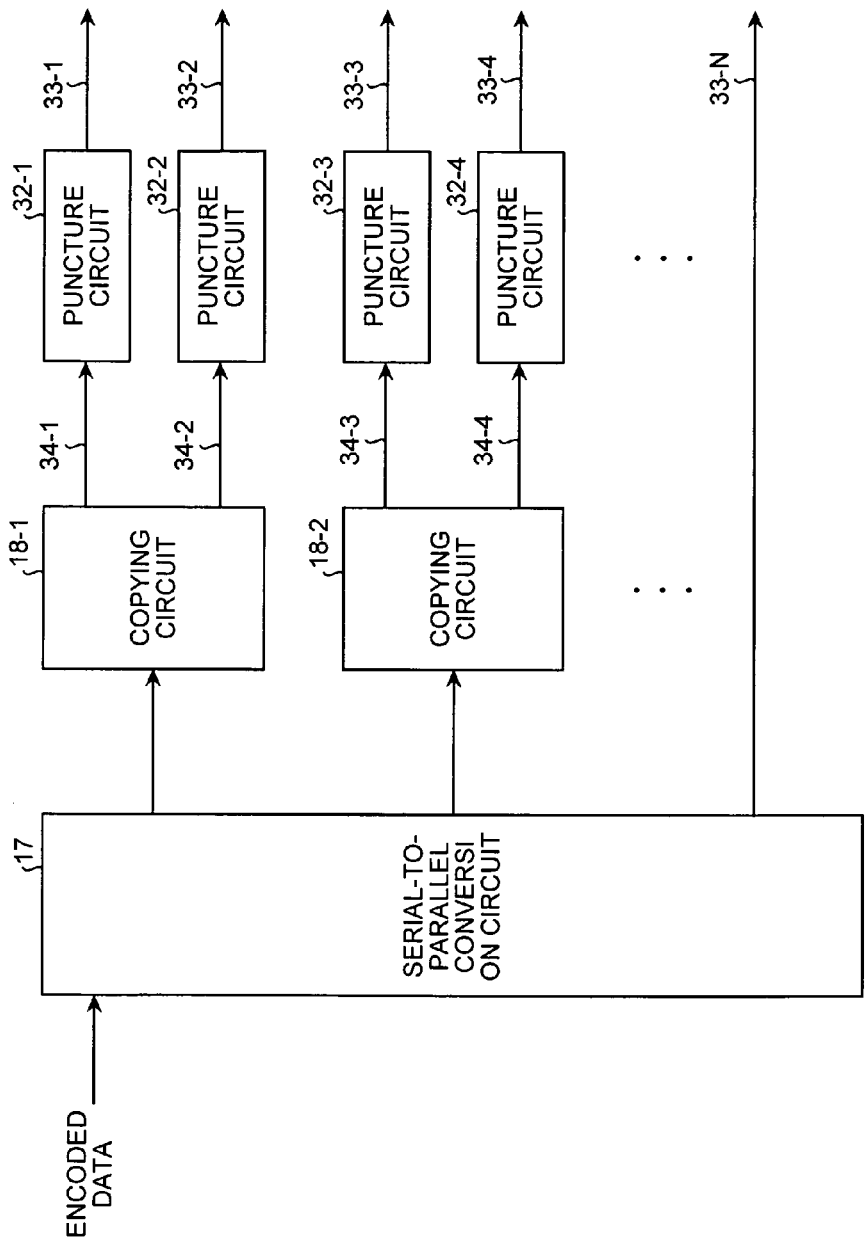
FIG. 18 is a schematic diagram of a data conversion control circuit 8 according to the fourth embodiment.

FIG. 18 shows a structure of the data conversion control circuit 8 according to the fourth embodiment. In FIG. 18, 32-1, 32-2, 32-3, 32-4, etc. denote first, second, third, fourth, and other puncture circuits respectively, and 33-1, 33-2, 33-3, . . . , and 33-N denote first, second, third, fourth, . . . , and N-th sub-modulation signal output terminals respectively. Constituent portions similar to those in the second embodiment explained with reference to FIG. 5 are attached with identical reference numerals, and their explanation will be omitted.

The operation of the radio communication system according to the fourth embodiment shown in FIG. 17 will be explained below. The channel encoder 31 carries out a channel encoding to the transmission data 30 to correct an error, and outputs the encoded data. The plurality of multi-modulators (3A, 3B, etc.) modulate the encoded data, and transmit the modulated data from the corresponding transmitter antennas (4A, 4B, etc.).

The operation of each multi-modulator will be explained below. In each multi-modulator, the data conversion control circuit 8 carries out a serial-to-parallel conversion, a copying, and a puncture processing to the encoded data, and outputs the processed data to the plurality of sub-modulators (9-1 to 9-N). The data conversion control circuit 8 generates a plurality of parallel data including the same data. The sub-modulators (9-1 to 9-N) receive the parallel data, and modulate the data in mutually different modulation frequencies. The weighting circuits (10-1 to 10-N) corresponding to the individual sub-modulators give weights (including complex numbers) to the received modulated signals. In the present embodiment, in the weighting of the carriers, at least one of weights for the same data is different between the plurality of multi-modulators. The combining circuit 11 combines the whole signals after the weighting, and outputs the combined result as a multiple modulation signal from the multiple modulation signal output terminal 12.

The operation of the data conversion control circuit 8 that becomes the characteristics of the present embodiment will be explained below. In the data conversion control circuit 8 according to the present embodiment, as shown in FIG. 18, first, the serial-to-parallel conversion circuit 17 converts the encoded data into parallel signals. The serial-to-parallel conversion circuit 17 outputs a part of the parallel signals to the copying circuits 18-1, 18-2, etc., and outputs the rest of the parallel signals to the sub-modulation signal output terminals (some of 33-1 to 33-N). The copying circuits 18-1, 18-2, etc. copy the received parallel signals thereby to generate a plurality of the same signals 34-1, 34-2, 34-3, 34-4, etc. (in this example, one copying circuit generates two same signals), and output these signals to the individual puncture circuits 32-1, 32-2, 32-3, 32-4, etc. The puncture circuits 32-1, 32-2, 32-3, 32-4, etc. output the signals after the puncture processing to the rest of the sub-modulation signal output terminals. As a result, it is possible to generate the parallel data including the same data.

Figure 19:
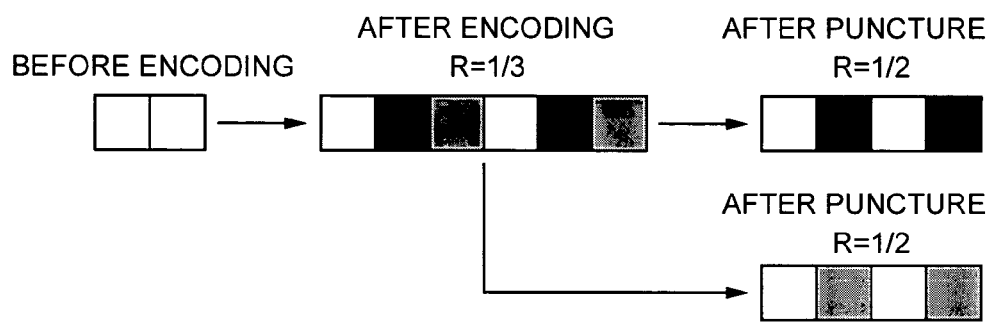
FIG. 19 illustrates a puncture method according to the fourth embodiment.

FIG. 19 shows a puncture method that each puncture circuit carries out according to the fourth embodiment. The channel encoder 31 channel encodes the transmission data 30 that is before the encoding, at an encoding rate of one third, and outputs the encoded data. For the channel encoding, a turbo code or a convolutional code is used.

Next, the serial-to-parallel conversion processing and the copying processing are carried out, thereby to generate the signals 34-1, 34-2, 34-3, 34-4, etc. To simplify the explanation, it is assumed that "the encoded data the signal 34-1=the signal 34-2". In other words, the serial-to-parallel conversion circuit 17 outputs the encoded data as it is.

Next, the puncture circuits 32-1 and 32-2 carry out a puncture processing to the same signals 34-1 and 34-2 in mutually different patterns, and generate sub-modulation signals. Specifically (refer to FIG. 19), the puncture circuit 32-1 deletes bits of gray portions, and outputs a data series of white portions and black portions. On the other hand, the puncture circuit 32-2 deletes the bits of the black portions, and outputs a data series of the white portions and the gray portions. Consequently, the encoding rate after the puncture becomes one half.

Figure 6:
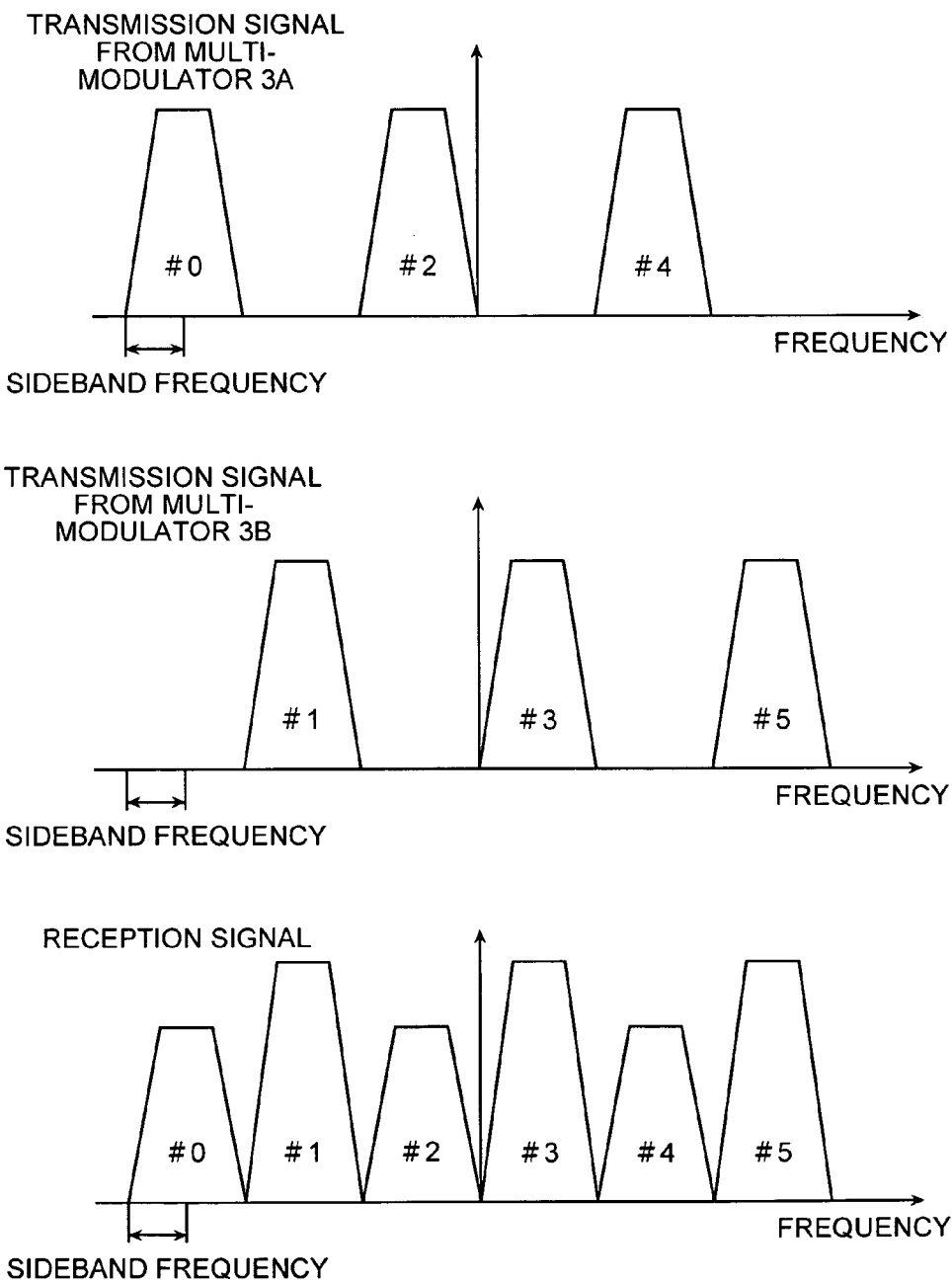
FIG. 6 illustrates an example of modulation by a multi-modulator.

After executing the above puncture method, as shown in FIG. 6, the multi-modulator 3A adds weights other than zero to the zero (corresponding to the output from the sub-modulation signal output terminal 33-1), second, and fourth SCPC carriers respectively, and adds the weight of zero to the first, third, and fifth SCPC carriers respectively. On the other hand, the multi-modulator 3B adds weights other than zero to the first (corresponding to the output from the sub-modulation signal output terminal 33-2), third, and fifth SCPC carriers respectively, and adds the weight of zero to the zero, second, and fourth SCPC carriers respectively. In this case, reception levels of the signals transmitted from the two transmitter antennas are different when it is assumed that the antennas are not correlated. In other words, the reception levels of the zero SCPC carrier and the first SCPC carrier vary independently.

Therefore, when the receiver diversity combines the reception signals of the same data portions (i.e., the white portions in FIG. 19) of the zero SCPC carrier and the first SCPC carrier, it is possible to obtain a diversity gain of two branches. The receiver does not carry out the diversity combining of the different data portions (i.e., the black portions and the gray portions in FIG. 19) of the zero SCPC carrier and the first SCPC carrier. The receiver carries out the decoding of all the data portions (i.e., the white portions, the black portions, and the gray portions) that are included in the zero SCPC carrier and the first SCPC carrier.

As explained above, in the present embodiment, the transmitter transmits a signal at the encoding rate of one half, and the receiver decodes the received signal at the encoding rate of one third. Therefore, it is possible to improve both the diversity gain and the encoding gain.

A radio communication system according to the fifth embodiment will be explained below. The present embodiment is different from the fourth embodiment in that only a puncture method that the puncture circuit carries out is different. Only the puncture method that is different from that of the fourth embodiment will be explained below.

Figure 20:
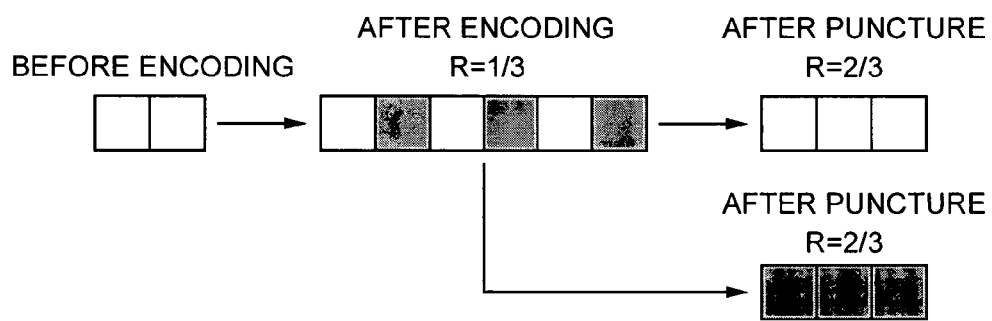
FIG. 20 illustrates a puncture method according to a fifth embodiment of the present invention.

FIG. 20 shows the puncture method according to the fifth embodiment. The puncture circuit 32-1 deletes the gray portions of the encoded data, and outputs a data series of the white portions. On the other hand, the puncture circuit 32-2 deletes the white portions of the encoded data, and outputs a data series of the gray portions. Therefore, an encoding rate after the puncture becomes two thirds.

As explained above, in the present embodiment, as the zero SCPC carrier and the first SCPC carrier do not include the same data portion, it is not possible to obtain a diversity gain. On the other hand, the transmitter transmits the signal at the high encoding rate of the two thirds, and the receiver decodes this reception signal at the encoding rate of one third by using both the zero SCPC carrier and the first SCPC carrier. As a result, it is possible to substantially improve the encoding rate.

INDUSTRIAL APPLICABILITY

As explained above, the radio communication system according to the present invention is useful for a mobile communication system like a mobile phone. Particularly, the radio communication system is suitable for a transmitter of the radio communication system that uses a plurality of SCPC carriers for an uplink.

The invention claimed is:

1. A radio communication system comprising a transmitter and a receiver, the transmitter having a plurality of transmission antennas, the receiver having a mechanism to perform a diversity reception, wherein
the transmitter further comprises a plurality of multi-modulators that allocate same transmission data to a plurality of carriers, combine all transmission signals obtained by weighting each of the carriers, and output combined transmission signals, wherein at least one of the weight values for the same transmission data is different between the multi-modulators in the weighting processing of the carriers
wherein the plurality of transmission antennas transmit signals including the weighted plurality of the carriers that cause different reception levels of the weighted carriers when the plurality of transmission antennas are not correlated.

2. The radio communication system according to claim 1, wherein the multi-modulator comprises
a data generating unit that generates a plurality of transmission data including same data;
a modulating unit that modulates the transmission data with different modulation frequencies, respectively, and generates a plurality of carrier signals;
a weighting unit that performs individual weighting processing to each of the carrier signals; and
a combining unit that combines the weighted signals.

3. The radio communication system according to claim 2, wherein the data generating unit comprises
a serial-to-parallel conversion unit that converts received serial data into parallel data; and
a copying unit that copies the parallel data by a predetermined number, and generates a plurality of transmission data including the same data.

4. A radio communication system comprising a transmitter and a receiver, the transmitter having a plurality of transmission antennas, the receiver having a mechanism to perform a diversity reception, wherein
the transmitter further comprises a plurality of multi-modulators that allocate same transmission data to a plurality of carriers, combine all transmission signals obtained by weighting each of the carriers, and output combined transmission signals, wherein at least one of the weight values for the same transmission data is different between the multi-modulators in the weighting processing of the carriers, and adds a delay to at least one of the same data
wherein the plurality of transmission antennas transmit signals including the weighted plurality of the carriers that cause different reception levels of the weighted carriers when the plurality of transmission antennas are not correlated.

5. The radio communication system according to the claim 4, wherein the multi-modulator comprises
a data generating unit that generates a plurality of transmission data including the same data of a different timing;
a modulating unit that modulates the transmission data with different modulation frequencies, respectively, and generates a plurality of carrier signals;
a weighting unit that performs individual weighting processing to each of the carrier signals; and
a combining unit that combines the weighted signals.

6. The radio communication system according to claim 5, wherein the data generating unit comprises
a serial-to-parallel conversion unit that converts received serial data into parallel data and
a copying and delaying unit that copies the parallel data by a predetermined number, and add a delay to at least one of the same data to generate a plurality of transmission data including the same data of a different timing.

7. A radio communication system comprising a transmitter having a plurality of transmission antennas, wherein the transmitter further comprises
an encoder that encodes transmission data at a predetermined encoding rate; and
a plurality of multi-modulators that allocate predetermined encoding data of a higher encoding rate than that of an encoding series that the encoder outputs to a plurality of carriers, combine all transmission signals obtained by weighting each carrier, and output combined transmission signals, wherein at least one of the weight values for the predetermined encoding data is different between the multi-modulators in the weighting processing of the carriers
wherein the plurality of transmission antennas transmit signals including the weighted plurality of the carriers that cause different reception levels of the weighted carriers when the plurality of transmission antennas are not correlated.

8. The radio communication system according to claim 7, wherein the multi-modulator comprises
an encoding data generating unit that generates parallel data including the same transmission data from an encoding series output from the encoder, and generates the predetermined encoding data by increasing an encoding rate of the parallel data;
a modulating unit that modulates the predetermined encoding data with different modulation frequencies, respectively, and generates a plurality of carrier signals;
a weighting unit that performs individual weighting processing to each of the carrier signals; and
a combining unit that combines the weighted signals.

9. The radio communication system according to claim 8, wherein the encoding data generating unit comprises a serial-to-parallel conversion unit that converts the encoding series output from the encoder into parallel data;

a copying unit that copies the converted data by a predetermined number, and generates parallel data including the same transmission data; and a thinning unit that thins a part of the parallel data including the same transmission data, and increases the encoding rate to generate the predetermined encoding data.

10. A transmitter comprising:

a plurality of multi-modulators that allocate the same transmission data to a plurality of carriers, combine the whole transmission signals obtained after weighting the carriers, and output the signals after the combining, wherein at least one of the weight values for the same transmission data is different between the multi-modulators in the weighting processing of the carriers wherein the transmitter transmits signals including the weighted plurality of carriers that causes different reception levels of the weighted carriers so that the reception levels of the plurality of carriers vary independently.

11. A transmitter comprising:

a plurality of multi-modulators that allocate same transmission data to a plurality of carriers, combine all transmission signals obtained by weighting each of the carriers, and output combined transmission signals, wherein at least one of the weight values for the same transmission data is different between the multi-modulators in the weighting processing of the carriers, and adds a delay to at least one of the same data wherein the transmitter transmits signals including the weighted plurality of carriers that causes different reception levels of the weighted carriers so that the reception levels of the plurality of carriers vary independently.

12. A transmitter comprising:

an encoder that encodes transmission data at a predetermined encoding rate; and a plurality of multi-modulators that allocate predetermined encoding data of a higher encoding rate than that of an encoding series that the encoder outputs to a plurality of carriers, combine all transmission signals obtained by weighting each carrier, and output combined transmission signals, wherein at least one of the weight values for the predetermined encoding data is different between the multi-modulators in the weighting processing of the carriers wherein the transmitter transmits signals including the weighted plurality of carriers that causes different reception levels of the weighted carriers so that the reception levels of the plurality of carriers vary independently.

* * * * *